(12) United States Patent
Ito et al.

(10) Patent No.: US 11,491,971 B2
(45) Date of Patent: Nov. 8, 2022

(54) VEHICLE CONTROL DEVICE AND VEHICLE

(71) Applicant: Hitachi Automotive Systems, Ltd., Hitachinaka (JP)

(72) Inventors: Takahiro Ito, Tokyo (JP); Kenichiro Matsubara, Hitachinaka (JP); Wataru Yokoyama, Hitachinaka (JP); Takaya Tsukagoshi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 166 days.

(21) Appl. No.: 16/979,765

(22) PCT Filed: Oct. 10, 2018

(86) PCT No.: PCT/JP2018/037785
§ 371 (c)(1),
(2) Date: Sep. 10, 2020

(87) PCT Pub. No.: WO2019/187260
PCT Pub. Date: Oct. 3, 2019

(65) Prior Publication Data
US 2021/0039631 A1  Feb. 11, 2021

(30) Foreign Application Priority Data

Mar. 27, 2018  (JP) .............................. JP2018-059368

(51) Int. Cl.
*B60W 30/04* (2006.01)
*B60T 7/12* (2006.01)
(Continued)

(52) U.S. Cl.
CPC .............. *B60W 30/04* (2013.01); *B60T 7/12* (2013.01); *B60T 8/1766* (2013.01); *B60T 8/30* (2013.01);
(Continued)

(58) Field of Classification Search
CPC . B60T 7/12; B60T 8/1766; B60T 8/30; B60T 2230/04; B60W 30/04;
(Continued)

(56) References Cited

U.S. PATENT DOCUMENTS

| 2010/0168975 | A1  | 7/2010 | Takahara et al. |
| 2011/0213527 | A1* | 9/2011 | Itabashi ................. B60W 10/11 701/37 |
| 2013/0245888 | A1* | 9/2013 | Kikuchi ................. B60G 17/06 701/38 |

FOREIGN PATENT DOCUMENTS

| JP | 10-264799 A | 10/1998 |
| JP | 2000-135973 A | 5/2000 |

(Continued)

OTHER PUBLICATIONS

Korean-language Office Action issued in Korean Application No. 10-2020-7026463 dated Oct. 27, 2021 with English translation (14 pages).

(Continued)

*Primary Examiner* — Tyler J Lee
*Assistant Examiner* — Yufeng Zhang
(74) *Attorney, Agent, or Firm* — Crowell & Moring LLP (57) ABSTRACT

A vehicle control device, a vehicle control method, and a vehicle suitable for an automatic/manual driving mode vehicle that employs brakes capable of controlling braking forces of four wheels. A vehicle control device including a pitch angle adjustment unit that adjusts a pitch angle, which is an inclination of a vehicle generated in the vehicle when braking the vehicle, or a change amount of the pitch angle, the pitch angle adjustment unit adjusting the pitch angle according to a traveling mode of the vehicle instructed by a host controller provided in the vehicle.

19 Claims, 7 Drawing Sheets

(51) Int. Cl.
*B60T 8/1766* (2006.01)
*B60T 8/30* (2006.01)

(52) U.S. Cl.
CPC . *B60W 2030/041* (2013.01); *B60W 2510/182* (2013.01); *B60W 2520/16* (2013.01)

(58) Field of Classification Search
CPC ..... B60W 2030/041; B60W 2510/182; B60W 2520/16; B60W 10/184; B60W 2720/16; B60W 60/0013
See application file for complete search history.

(56) References Cited

FOREIGN PATENT DOCUMENTS

| JP | 2006-240584 A | 9/2006 |
|---|---|---|
| JP | 2007-326399 A | 12/2007 |
| JP | 2008-201291 A | 9/2008 |
| JP | 2010-264799 A | 11/2010 |
| JP | 2013-189153 A | 9/2013 |
| JP | 2017-105224 A | 6/2017 |
| JP | 2017-109664 A | 6/2017 |

OTHER PUBLICATIONS

International Search Report (PCT/ISA/210) issued in PCT Application No. PCT/JP2018/037785 dated Jan. 15, 2019 with English translation (four (4) pages).
Japanese-language Written Opinion (PCT/ISA/237) issued in PCT Application No. PCT/JP2018/037785 dated Jan. 15, 2019 (five (5) pages).
Chinese-language Office Action issued in Chinese Application No. 201880090766.X dated Jun. 16, 2022 with English translation (13 pages).

\* cited by examiner

VEHICLE CONTROL DEVICE AND VEHICLE

TECHNICAL FIELD

The present invention relates to a vehicle control device and a vehicle, and more particularly to a vehicle control device in an automatic/manual driving mode vehicle having both a manual driving mode and an automatic driving mode, and the vehicle.

BACKGROUND ART

A technique described in PTL 1 is known as a vehicle equipped with a brake capable of controlling a braking force for four wheels. According to PTL 1, this device is applied to "a vehicle which has front wheel side suspensions and rear wheel side suspensions with an anti-dive geometry and an anti-lift geometry. A degree of an anti-lift effect of the anti-lift geometry is larger than a degree of an anti-dive effect of the anti-dive geometry. Normally, a front-to-rear braking force distribution is adjusted to a basic distribution during the distribution of the brakes. In contrast, in a state where abrupt application of brakes is started, the front-to-rear braking force distribution is adjusted to a first distribution, at which the braking force applied to the respective rear wheels is larger than that of the basic distribution, instead of the basic distribution during a predetermined short period from the time of starting the application of the brakes. As a result, the amount of increase in the anti-lift effect becomes larger than the amount of decrease in the anti-dive effect, so that the anti-pitching moment of the entire vehicle is increased."

CITATION LIST

Patent Literature

PTL 1: JP 2008-201291 A

SUMMARY OF INVENTION

Technical Problem

When the pitching control disclosed in PTL 1 is incorporated, pitching during braking can be effectively suppressed. In particular, it is possible to suppress sway felt by a passenger in a vehicle having an automatic driving mode, so that the vehicle having a good riding comfort can be implemented.

Meanwhile, it is considered that vehicles having a plurality of traveling modes such as an automatic driving mode and a manual driving mode will be developed and increased in the future. In such vehicles, when the present pitching control is used in the manual driving mode as in an autonomous driving mode, a nose dive decreases so that a sense of braking felt by a driver is reduced. Therefore, it is assumed that the driver sometimes feels a sense of discomfort due to an insufficient sense of braking when a brake pedal is depressed, depending on a case.

An object of the present invention is to provide a vehicle control device and a vehicle that can improve a riding comfort of a passenger and a driving sense of a driver even in a vehicle having a plurality of traveling modes such as an automatic driving mode and a manual driving mode.

Solution to Problem

In order to achieve the above object, the present invention provides "a vehicle control device including a pitch angle adjustment unit that adjusts a pitch angle, which is an inclination of a vehicle generated in the vehicle when braking the vehicle, or a change amount of the pitch angle, in which the pitch angle adjustment unit adjusts the pitch angle according to a traveling mode of the vehicle instructed by a host controller provided in the vehicle."

Further, the present invention provides a "vehicle control device for a vehicle traveling in both a manual driving mode in which traveling is performed by a driver operating a steering wheel and a brake of the vehicle and an automatic driving mode in which an automatic driving control device automatically drives the vehicle, the vehicle control device including: a selection signal input means for inputting a selection signal for the manual driving mode and the automatic driving mode; a brake control signal output means for outputting a brake control signal for a front wheel of the vehicle and a brake control signal for a rear wheel of the vehicle; and a calculation unit that applies the brake control signal for the front wheel of the vehicle and the brake control signal for the rear wheel of the vehicle to change a braking timing between the rear wheel and the front wheel or to change a braking force distribution between the rear wheel and the front wheel, in order to change a pitch angle between the manual driving mode and the automatic driving mode."

Further, the present invention provides a "vehicle equipped with the above vehicle control device".

Advantageous Effects of Invention

According to the present invention, it is possible to provide the vehicle control device and the vehicle that can improve the riding comfort of the passenger and the driving sense of the driver even in the vehicle having the plurality of traveling modes such as the automatic driving mode and the manual driving mode.

DESCRIPTION OF EMBODIMENTS

Hereinafter, embodiments of the present invention will be described with reference to the drawings.

First Embodiment

Figure 1:
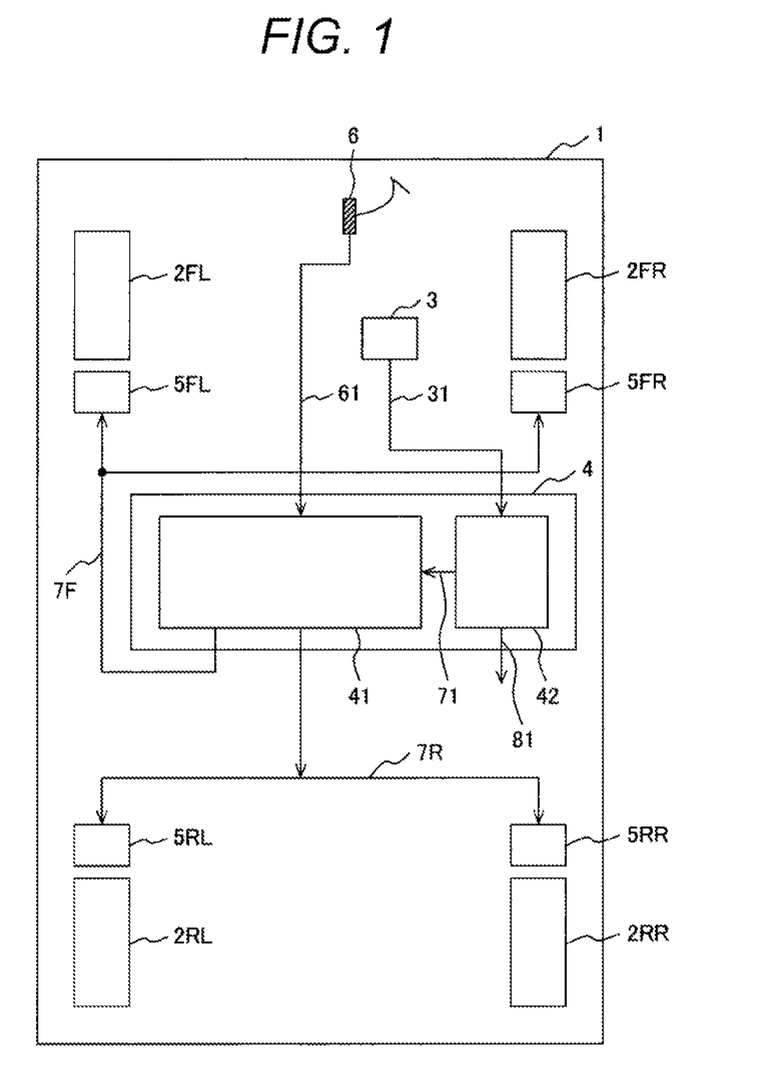
FIG. 1 is a diagram illustrating an example of an overall configuration of an automatic/manual driving mode vehicle having both an automatic driving mode and a manual driving mode.

FIG. 1 is a diagram illustrating an example of an overall configuration of an automatic/manual driving mode vehicle having both an automatic driving mode and a manual driving mode.

In FIG. 1, reference sign 1 denotes the automatic/manual driving mode vehicle having both the automatic driving mode and the manual driving mode. Note that this will be simply referred to as the "vehicle" hereinafter unless otherwise necessary.

The vehicle 1 includes at least four wheels 2 on the front, rear, left, and right sides, and brakes 5 for the respective wheels. Note that subscripts are attached to the reference signs 2 and 5 for the wheel 2 and the brake 5, where the left subscripts F and R distinguish the front and rear sides, and the right subscripts L and R distinguish the left and right sides. However, the subscripts are omitted if it is not particularly necessary.

Further, the vehicle 1 is equipped with a control device 4 in order to perform driving in the automatic driving mode and the manual driving mode. As a configuration example of the control device 4, only an automatic driving control device 42 and a brake control device 41 are described in FIG. 1, but an appropriate configuration example including other controllers can be made. Note that the control device 4 handles a plurality of inputs and a plurality of outputs in order to enable driving in the automatic driving mode and the manual driving mode, but only the inputs and outputs related to the present invention are described here. Here, the automatic driving mode is a driving mode which includes a vehicle operation without using a steering wheel and in which traveling is automatically performed toward a destination by recognizing, for example, a white line on a public road. The manual driving mode is a driving mode by the steering wheel operated by a driver.

An input for implementation of the present invention is a mode selection signal 31 applied by an automatic/manual driving mode selection switch 3. Another input is a brake signal 61 indicating the amount of depression of a brake pedal 6. Note that the automatic/manual driving mode selection switch 3 may be installed at any location near driver's seat so as to enable the selection of the driver or may interlock with the brake pedal 6 to determine the automatic driving mode and the manual driving mode.

Outputs for implementation of the present invention are a brake signal 7F for the brakes 5FL and 5FR of the front wheels 2FL and 2FR, and a brake signal 7R for the brakes 5RL and 5RR of the rear wheels 2RL and 2RR. The brake signals 7F and 7R define braking forces for the wheels 2. Note that an example is illustrated in which the brake signals 7F and 7R are applied to the front and rear wheels 2F and 2R, respectively, in the following embodiment, but brake signals may be applied to four wheels individually.

The control device 4 is implemented using a computer, and is constituted by a memory, a calculation unit, a signal bus, an input unit, an output unit, and the like. Although not illustrated in FIG. 1, the control device 4 includes: a selection signal input means for inputting the selection signal 31 for the manual driving mode and the automatic driving mode; a brake signal input means for inputting the brake signal 61; and a brake control signal output means for applying the brake control signal 7F for the front wheels of the vehicle and the brake control signal 7R for the rear wheels of the vehicle. Further, as will be described later, the calculation unit applies a brake control signal for the front wheels of the vehicle and a brake control signal for the rear wheels of the vehicle in different distributions between the manual driving mode and the automatic driving mode. From this point of view, it can be said that the calculation unit has a function as a pitch angle adjustment unit.

According to the device configuration example of FIG. 1, the automatic driving control device 42 applies an automatic driving control signal 81 to a steering wheel, an accelerator, a brake, and other operating ends in the vehicle at appropriate timings to automatically drive the vehicle 1 using an automatic driving processing function (not illustrated) when automatic driving is instructed by the mode selection signal 31 applied by the automatic/manual driving mode selection switch 3. Although the description is omitted, when a brake operation is performed by the automatic driving processing function, an automatic driving brake signal 71 is applied to the brake control device 41.

Note that the driver's operations on the steering wheel, accelerator, brake, and other operating ends in the vehicle are executed via a control device for manual driving (not illustrated) in the manual driving mode, but the description of this part is omitted. In FIG. 1, the brake signal 61 indicating the amount of depression of the brake pedal 5 during the brake operation performed by the driver is applied to the brake control device 41.

The brake control device 41 inputs the brake signal 61 and the automatic driving brake signal 71 to perform brake processing of the vehicle 1 corresponding to each brake signal.

Figure 2:
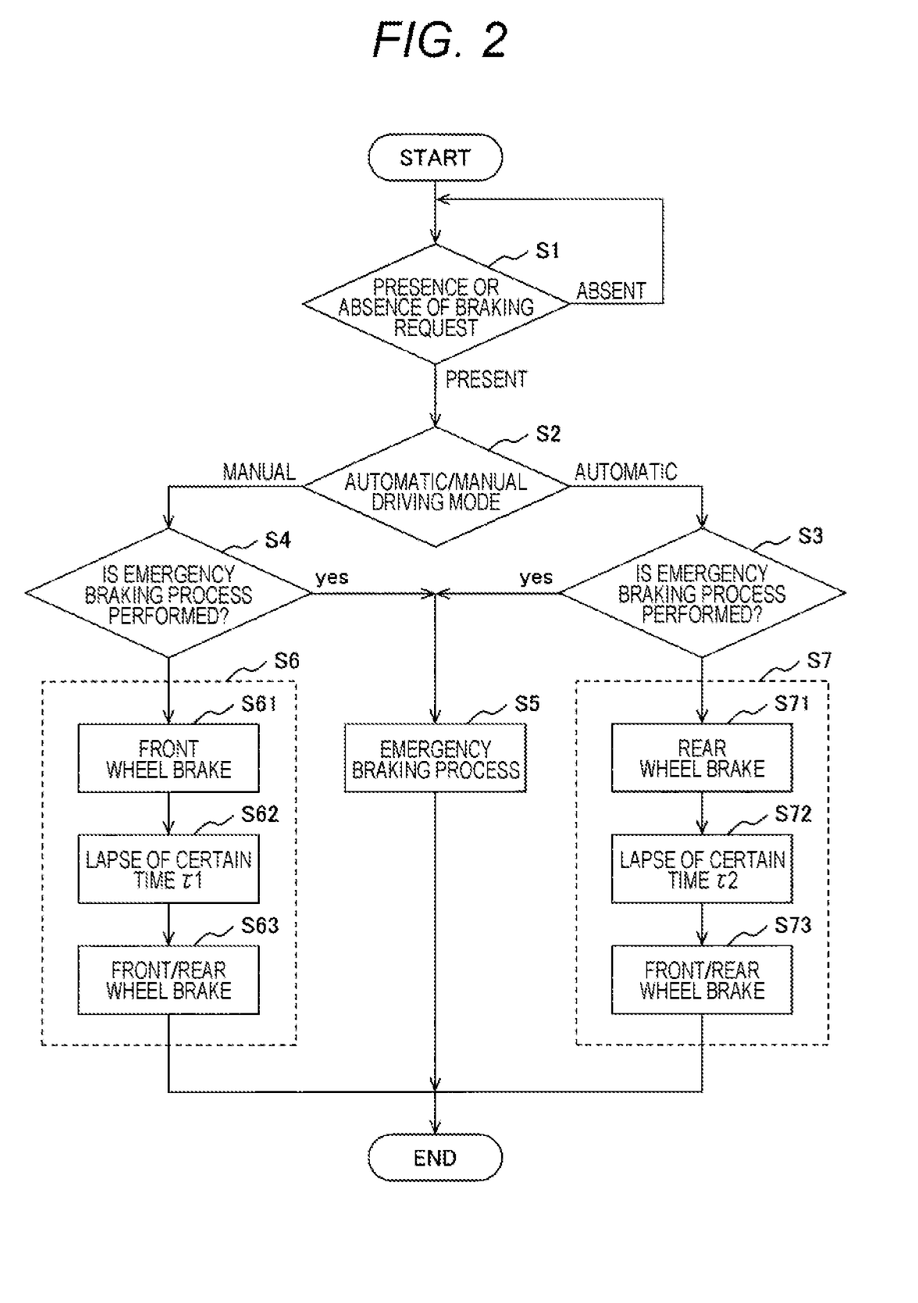
FIG. 2 is a flowchart illustrating a processing content of a control device 4.

FIG. 2 is a flowchart illustrating a processing content of the control device 4. Note that FIG. 2 describes only the processing during the brake operation related to the present invention, and operation processing in the normal manual driving mode or automatic driving mode operation is omitted assuming that the processing is appropriately executed.

The flow of FIG. 2 is constantly executed in a predetermined control cycle after an engine of the vehicle 1 is started, and the first processing step S1 determines whether there is a braking request. The presence or absence of the braking request is determined based on the brake signal 61 indicating the amount of depression of the brake pedal 5 in the manual driving mode, and the automatic driving brake signal 71 applied by the automatic driving control device 42 is used for the determination in the automatic driving mode.

In the next processing step S2, the automatic/manual driving mode is determined, and the processing proceeds to processing step S3 in the automatic driving mode, and the processing proceeds to processing step S4 in the manual driving mode. The determination on the automatic/manual driving mode is made based on the mode selection signal 31 applied by the automatic/manual driving mode selection switch 3.

Processing steps S3 and S4 both determine whether an emergency braking process is performed.

Whether emergency braking is possible is determined, for example, by determining that a braking request value is equal to or larger than a threshold or a wheel slip amount is equal to or larger than a predetermined value, and the emergency braking process in processing step S5 is executed. At this time, comfort control (control that pursues stability in the automatic driving mode and control that gives a sense of deceleration in the manual driving mode) that the present invention aims at is not executed.

When it is determined that the emergency braking process is not performed in processing step S3, the control that pursues stability in the automatic driving mode is executed in processing step S7. More specifically, control for the rear wheel brake is executed independently in processing step S71, the lapse of a certain time τ2 is confirmed in processing step S72, and then, combined control for the front/rear wheel brakes is executed in processing step S73. With such sequence control, a pitch angle during braking is reduced, and a passenger can feel the stability since sway of the vehicle body during braking is reduced.

When it is determined that the emergency braking process is not performed in processing step S4, the control that pursues the sense of deceleration in the manual driving mode is executed in processing step S6. More specifically, control for the front wheel brake is executed independently in processing step S61, the lapse of a certain time τ1 is confirmed in processing step S62, and then, combined control for the front/rear wheel brakes is executed in processing step S63. With such control, the pitch angle during braking is increased, and the passenger can strongly feel the sense of deceleration during braking.

Note that the control in FIG. 2 is continuously executed until the vehicle is stopped or re-accelerated, and thereafter, confirmation and standby processing are performed until a braking request is made again.

Figure 3A:
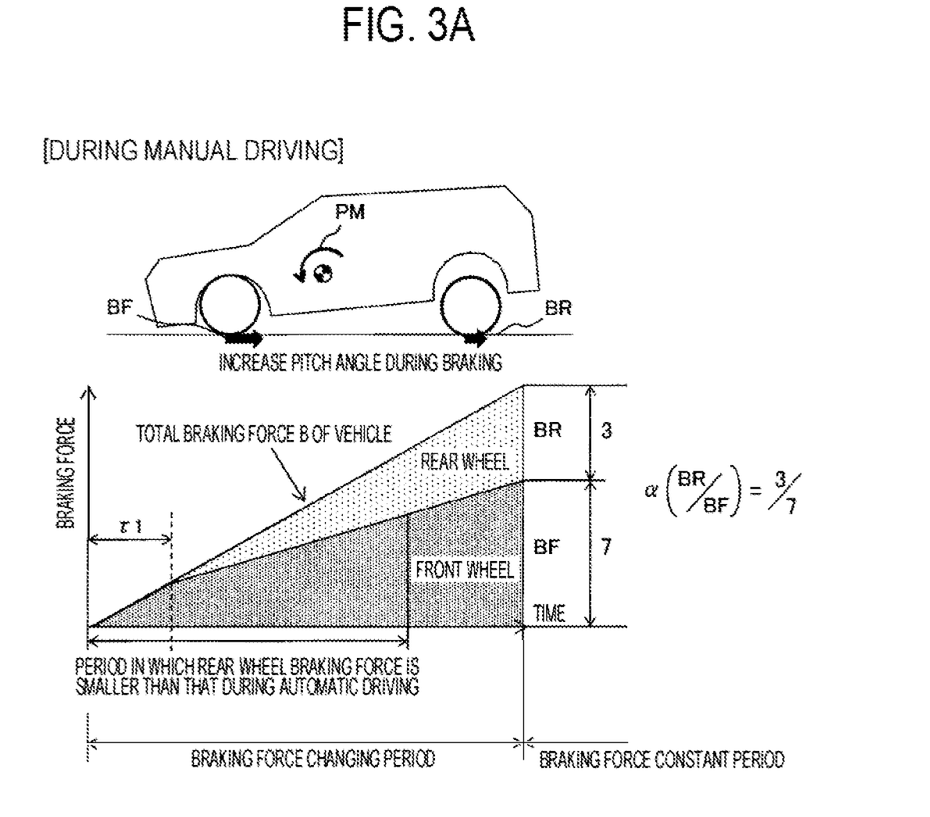
FIG. 3A is a view illustrating temporal changes of braking forces applied to front/rear wheels when the braking forces are extremely generated during manual driving.
Figure 3B:
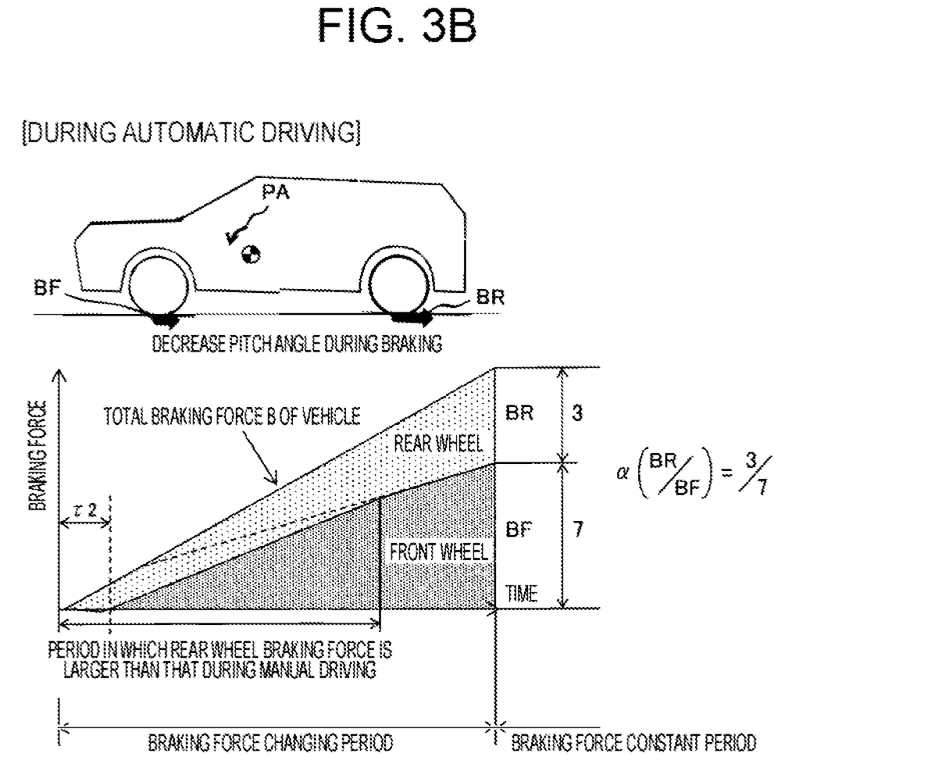
FIG. 3B is a view illustrating temporal changes of braking forces applied to the front/rear wheels during automatic driving.

FIG. 3a and FIG. 3b are views illustrating temporal changes of the braking forces applied to the front/rear wheels during each of manual driving and automatic driving. Note that FIG. 3a illustrates an example in which the braking force is extremely generated during manual driving. Further, FIG. 3b illustrates a case where a final distribution is not changed between manual driving and automatic driving. Comparing the drawings of FIGS. 3a and 3b, the following becomes clear.

First, attention is paid to the temporal changes of the braking forces applied to the front/rear wheels in FIGS. 3a and 3b. Then, front wheel braking precedes, and then, is performed together with rear wheel braking after confirming the lapse of the certain time τ1 in the example where the braking force is extremely generated during manual driving. During automatic driving, however, rear wheel braking precedes, and then, is performed together with front wheel braking after confirming the lapse of the certain time τ2. Therefore, there is a period in which a rear wheel braking force is smaller during manual driving than during automatic driving, and there is a period in which the rear wheel braking force is larger during automatic driving than during manual driving. In other words, it can be said that a period of increasing a front wheel braking force is provided during manual driving, and a period of increasing the rear wheel braking force is provided during automatic driving.

Figure 6:
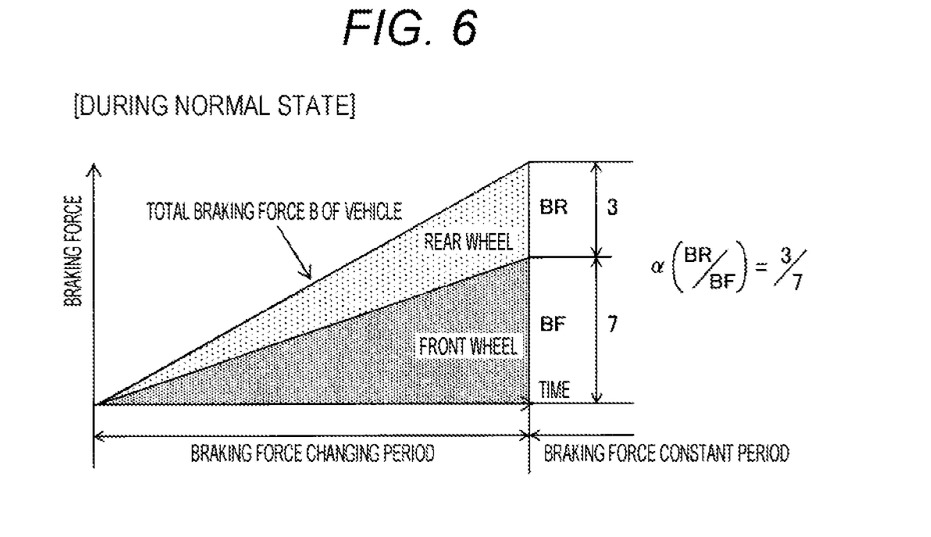
FIG. 6 is a view illustrating temporal changes of braking forces applied to front/rear wheels in basic control during manual driving.

Note that FIG. 3a is the view illustrating the temporal changes of the braking forces applied to the front/rear wheels when the braking force is extremely generated during manual driving, but it is unnecessary to generate an extreme braking force during basic normal manual driving, and thus, it is preferable to perform control as illustrated in FIG. 6. FIG. 6 is a view illustrating temporal changes of braking forces applied to the front/rear wheels in basic control during manual driving. According to the basic control of FIG. 6, the front wheels are not subjected to braking prior to the rear wheels during a braking force changing period, but the braking forces are applied almost at the same time.

Each control of FIGS. 3a and 6 sets two driving modes for manual driving, and it can be said that FIG. 6 is a basic control mode and FIG. 3a is a sports mode, for example. In a third embodiment to be described later, a description will be given regarding a case where each control of FIGS. 3a and 6 is employed together.

Next, attention is paid to the degrees of the braking forces applied to the front/rear wheels in FIGS. 3a and 3b. As illustrated in these drawings, a total braking force B applied to the vehicle is the sum of a front wheel braking force BF and a rear wheel braking force BR, and a braking period shifts from an initial braking force changing period to a constant braking force period thereafter.

According to these drawings, when attention is paid to the initial braking force changing period as the braking period, regarding the braking force B applied to the vehicle in this period, the front wheel braking force BF is made larger than the rear wheel braking force BR during manual driving, and the front wheel braking force BF is made smaller than the rear wheel braking force BR during automatic driving based on the relative comparison with the manual driving.

Further, regarding the constant braking force period, an example in which the final distributions are the same in FIGS. 3a and 3b is illustrated here. That is, the example is illustrated in which control is performed such that a ratio α (=BR/BF) of the rear wheel braking force BR to the front wheel braking force BF in the constant braking force period during manual driving is about 3/7, and a ratio α (=BR/BF) of the rear wheel braking force BR to the front wheel braking force BF in the constant braking force period during automatic driving is about 3/7.

Figure 7:
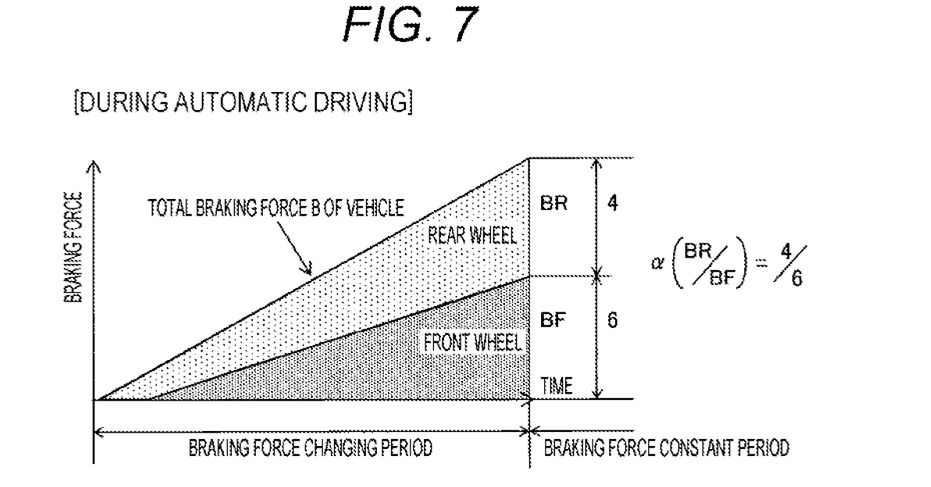
FIG. 7 is a view illustrating temporal changes of braking forces applied to front/rear wheels when a final distribution is changed between manual driving and automatic driving.

On the other hand, the final distribution in the constant braking force period may be changed. FIGS. 6 and 7 illustrate a case where the final distribution is changed between manual driving and automatic driving, which indicate that, for example, the ratio α (=BR/BF) of the rear wheel braking force BR to the front wheel braking force BF in the constant braking force period during manual driving is about 3/7, and the ratio α (=BR/BF) of the rear wheel braking force BR to the front wheel braking force BF in the constant braking force period during automatic driving is set to about 4/6.

There are effects that a change amount of the pitch angle can be made gentle when the final distribution is not changed between manual driving and automatic driving as illustrated in FIG. 3b, and that the pitch angle can be reduced when the final distribution is changed between manual driving and automatic driving as illustrated in FIGS. 6 and 7. Note that the pitch angle means a final inclination (pitch angle), and the change amount of the pitch angle means a change amount as the inclination (pitch angle) from the start to the end of the brake. In the present specification, these are simply referred to as the pitch angle unless it is necessary to distinguish them.

Furthermore, attention is paid to the pitch angle of the vehicle and/or the change amount of the pitch angle in FIGS. 3a and 3b as a result of the above control, it can be seen that a pitch angle and/or a pitch angle change amount PA of the vehicle during automatic driving is small, and a pitch angle and/or a pitch angle change amount PM of the vehicle during manual driving is large. In the first embodiment, the pitch angle or the change amount of the pitch angle is adjusted by changing the order or timing of applying the braking force to the front and rear wheels.

As is clear from the above description, it is preferable to switch to control the front and rear wheel braking forces such that the vehicle pitch angle and/or the change amount of the pitch angle becomes larger during manual driving than during automatic driving as a solution for an object of satisfying both a user who values the riding comfort and a user who desires to enjoy the sense of deceleration. Further, it is preferable to have the period (time) in which the rear wheel braking force is larger during automatic driving than during manual driving.

As a result of the above configuration, it is possible to change generation timings of the front and rear wheel braking forces according to the traveling mode of the vehicle and implement the riding comfort according to the mode. In other words, it is possible to give the sense of deceleration by performing control so as to increase pitching during braking when the driver drives the vehicle, and to reduce the sway of the vehicle body by performing control so as to decrease pitching during automatic driving with no driver.

Second Embodiment

In the first embodiment, the order and timing of applying the braking forces to the front and rear wheels are changed between automatic driving and manual driving. The first embodiment is control based on the braking force application sequence and timing, but a pitch angle and/or a change amount of the pitch angle of a vehicle is positively controlled as a feedback signal to a target value thereof in a second embodiment.

Figure 4:
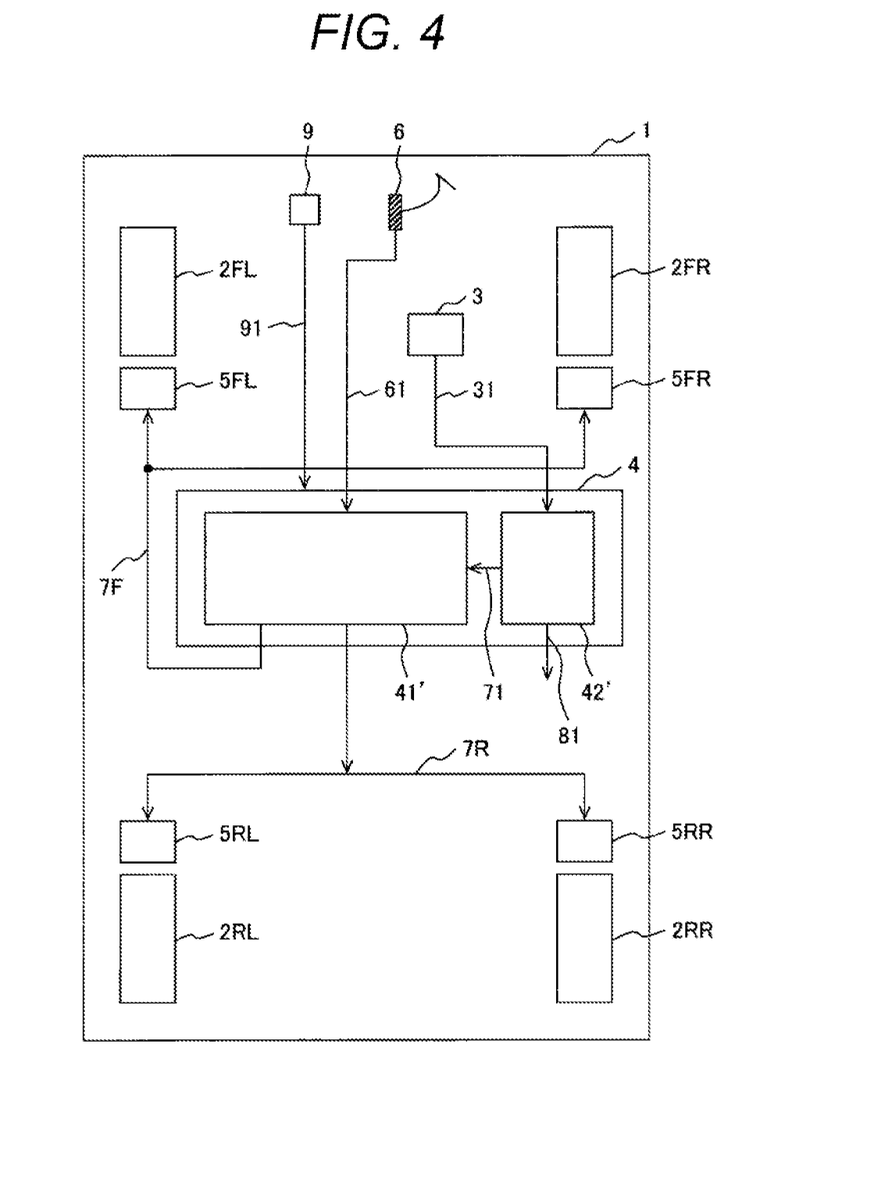
FIG. 4 is a diagram illustrating an example of an overall configuration of an automatic/manual driving mode vehicle having both an automatic driving mode and a manual driving mode according to a second embodiment.

FIG. 4 is a diagram illustrating an example of an overall configuration of an automatic/manual driving mode vehicle having both an automatic driving mode and a manual driving mode according to the second embodiment. A difference from FIG. 1 is that the control device 4 incorporates a vehicle pitch angle signal from a sensor 9 that detects the pitch angle and/or the change amount of the pitch angle of the vehicle. Note that the vehicle pitch angle and/or the change amount of the pitch angle can be measured directly or indirectly by an appropriate acceleration sensor installed in the vehicle.

Further, reference signs 41' and 42' denote the brake control device 41 and the automatic driving control device 42, respectively, in this drawing, but it is preferable to consider that functions thereof are a host controller and a pitch angle adjustment unit, respectively, in the description of the second embodiment, and thus, these terms will be used hereinafter.

Figure 5:
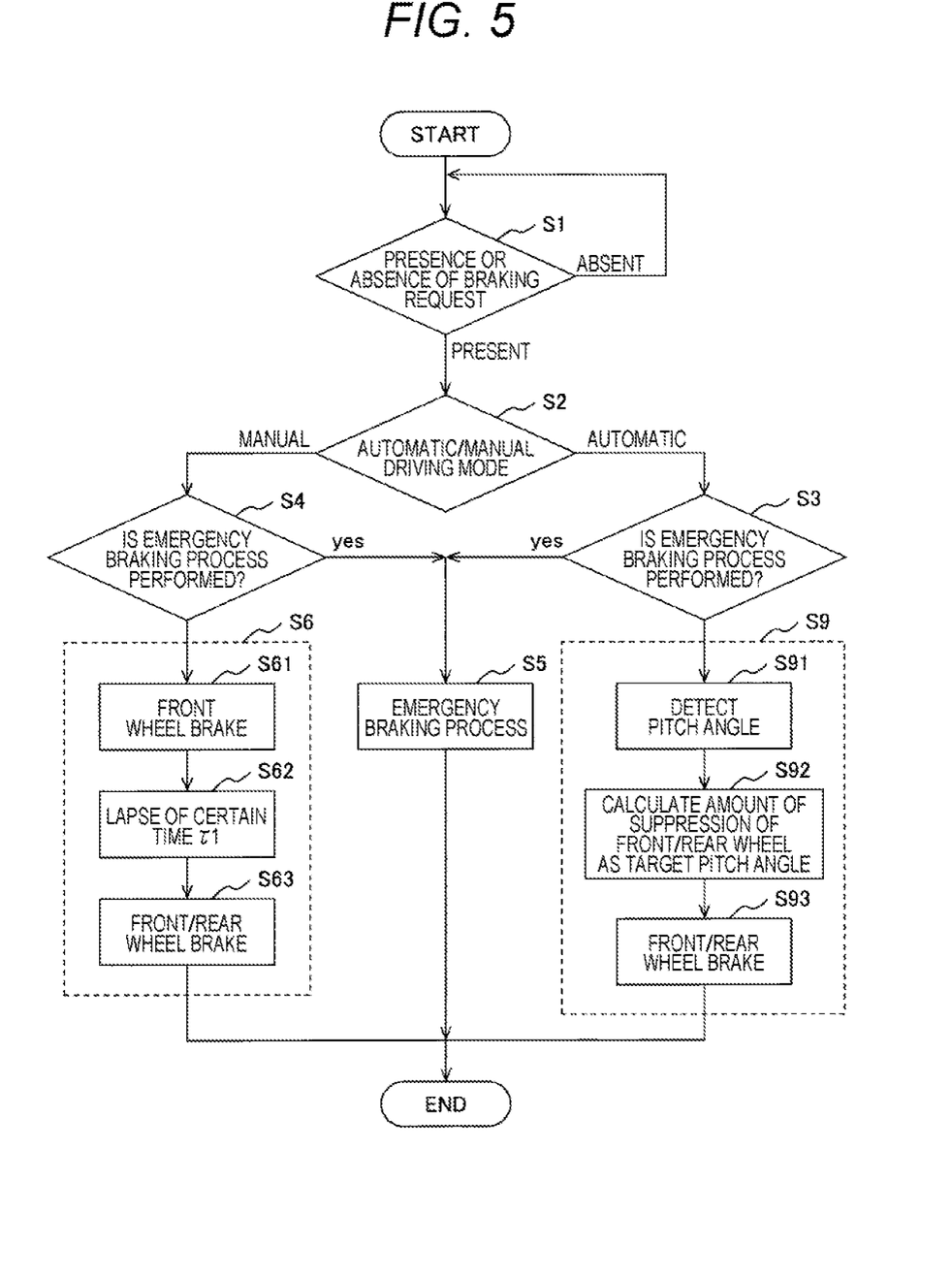
FIG. 5 is a flowchart illustrating a processing content of the control device 4 according to the second embodiment.

FIG. 5 is a flowchart illustrating a processing content of the control device 4 according to the second embodiment. Note that FIG. 5 describes only the processing during a brake operation related to the present invention, and processing in a normal driving operation is omitted assuming that the processing is appropriately executed. Further, the flow of FIG. 5 is basically different from the flow of FIG. 5 in terms of processing step S9.

The flow of FIG. 5 is constantly executed in a predetermined control cycle after an engine of the vehicle 1 is started, and the first processing step S1 determines whether there is a braking request. The presence or absence of the braking request is determined based on the brake signal 61 indicating the amount of depression of the brake pedal 5 in the manual driving mode, and the automatic driving brake signal 71 applied by the automatic driving control device 42 is used for the determination in the automatic driving mode.

In the next processing step S2, the automatic/manual driving mode is determined, and the processing proceeds to processing step S3 in the automatic driving mode, and the processing proceeds to processing step S4 in the manual driving mode. The determination on the automatic/manual driving mode is made based on the mode selection signal 31 applied by the automatic/manual driving mode selection switch 3.

Processing steps S3 and S4 both determine whether an emergency braking process is performed.

Whether emergency braking is possible is determined, for example, by determining that a braking request value is equal to or greater than a threshold or a wheel slip amount is equal to or greater than a predetermined value, and the emergency braking process in processing step S5 is executed. At this time, comfort control (control that pursues stability in the automatic driving mode and control that gives a sense of deceleration in the manual driving mode) that the present invention aims at is not executed.

When it is determined that the emergency braking process is not performed in processing step S4, the control that pursues the sense of deceleration in the manual driving mode is executed in processing step S6. More specifically, control for the front wheel brake is executed independently in processing step S61, the lapse of a certain time τ1 is confirmed in processing step S62, and then, combined control for the front/rear wheel brakes is executed in processing step S63. With such control, the pitch angle during braking is increased, and the passenger can strongly feel the sense of deceleration during braking.

Note that the brake control in processing step S6 is not necessarily limited to be the above-described one.

The braking force may be applied according to the amount of depression of the brake.

When it is determined that the emergency braking process is not performed in processing step S3, the control that pursues stability in the automatic driving mode is executed in processing step S9. More specifically, the vehicle pitch angle signal from the sensor 9 that detects the vehicle pitch angle and/or the change amount of the pitch angle is taken in processing step S91, each suppression amount of the front and rear wheels is calculated depending on a difference between the detected vehicle pitch angle and/or pitch angle change amount, and a target vehicle pitch angle and/or pitch angle change amount in processing step S92, and brake control to apply the calculated suppression amount to the front and rear wheels is executed in processing step S93. Then, each suppression amount of front and rear wheels is controlled such that the vehicle pitch angle and/or the change amount of the pitch angle matches the target value, the pitch angle during braking decreases, and a passenger can feel the stability since vehicle sway during braking is reduced.

Note that a mechanism by which a pitch angle fluctuates during a brake operation in a vehicle is already well known, and it is easy for those skilled in the art to calculate a braking force reversely from the pitch angle side, and thus, a detailed calculation method will not be described.

According to the flowchart of the second embodiment, the pitch angle adjustment unit 41' adjusts the pitch angle according to the traveling mode of the vehicle instructed by the host controller 42' provided in the vehicle. Further, the pitch angle and/or the change amount of the pitch angle is controlled to be larger in the manual driving mode than in the automatic driving mode. The pitch angle adjustment unit 41' adjusts the pitch angle and/or the change amount of the pitch angle by adjusting the braking forces of the front wheel brake and the rear wheel brake, respectively.

Third Embodiment

In the first embodiment, the order and timing of applying the braking forces to the front and rear wheels are changed between automatic driving and manual driving. In the second embodiment, the vehicle pitch angle and/or the change amount of the pitch angle is positively controlled as the feedback signal to the target value.

On the other hand, in a third embodiment, a sense of stability and a sense of deceleration are considered from a viewpoint different from those of the first and second embodiments.

Specifically, a manual driving mode will be divided into a mild manual driving mode and a manual driving mode that positively gives the sense of deceleration. The manual driving mode that positively gives the sense of deceleration is, for example, a sports mode or the like, and this mode is referred to as a vehicle body sway braking mode here, and the manual driving mode that is mild relative to the vehicle body sway braking mode or an automatic driving mode is referred to as a vehicle body sway suppression braking mode.

In this manner, the vehicle body sway braking mode and the vehicle body sway suppression braking mode are set as two driving modes for the manual driving mode in the third embodiment. As a control method for implementation thereof, the control of FIG. 6 can be adopted in the vehicle body sway braking mode, and the control of FIG. 3b can be adopted in the vehicle body sway suppression braking mode.

In the third embodiment, control is performed such that a pitch angle is larger in the vehicle body sway braking mode than in the vehicle body sway suppression braking mode, and a pitch angle adjustment unit is configured to switch between the vehicle body sway braking mode and the vehicle body sway suppression braking mode by adjusting the pitch angle. Note that it goes without saying that the automatic/manual driving mode selection switch 3 includes the vehicle body sway braking mode in this case, and it is preferable to provide a changeover switch for the vehicle body sway braking mode and the other driving mode.

Furthermore, as a method of separately implementing the vehicle body sway braking mode and the mild manual driving mode, it is advantageous to adjust the time τ1 which is the preceding control period for the front wheels in the first embodiment. For example, when the front wheel preceding control period τ1 in the vehicle body sway braking mode is set to be longer than the front wheel preceding control period τ1 in the mild manual driving mode, it is possible to further increase the pitch angle, and to implement driving with the sense of deceleration.

Further, it is preferable to perform control in a vehicle body sway braking mode when a braking force generated by a rear wheel brake required by a vehicle control device is larger than a braking force upper limit value. Furthermore, the braking force upper limit value is preferably set to a value smaller than a braking force by which the wheels are locked.

Fourth Embodiment

In a fourth embodiment, consideration will be given to a sense of stability and a sense of deceleration from a viewpoint different from those of the first, second, and third embodiments. Here, control is executed by identifying whether there is a single passenger or there are a plurality of passengers.

For example, in the fourth embodiment, a vehicle has, as a traveling mode, a single boarding mode in which only a driver is aboard, and a plural boarding mode in which a passenger other than the driver is also aboard, and a pitch angle adjustment unit performs control such that a pitch angle or a change amount of the pitch angle is larger in the single boarding mode than in the plural boarding mode.

Note that the distinction between the single boarding mode and the plural boarding mode may be determined based on the load, or may be selected by a passenger.

In the present invention, the following control is preferably performed through the first, second and third embodiments. First, it is preferable to increase the pitch angle when the braking force of the vehicle increases by setting a start timing of increasing the front wheel brake to be earlier than a timing of increasing the operation of the rear wheel brake. Further, it is preferable to increase the pitch angle when the braking force of the vehicle increases by setting an operation start timing of the front wheel brake to be earlier than an operation start timing of the rear wheel brake. It is preferable to increase the pitch angle when the braking force of the vehicle increases by providing a region where an operation is performed such that the braking force by the front wheel brake is larger than the braking force by the rear wheel brake. Regarding the change amount of the pitch angle when the braking force of the vehicle decreases, it is preferable to increase the change amount of the pitch angle by providing a region where an operation is performed such that the braking force of the front wheel brake is smaller than the braking force of the rear wheel brake. It is preferable to adjust the change amount of the pitch angle when the braking force of the vehicle decreases such that a timing at which the braking force generated by the front wheel brake becomes zero is later than a timing at which the braking force generated by the rear wheel brake becomes zero.

Note that it is preferable to perform control such that the pitch angle or the change amount of the pitch angle is larger in the single boarding mode than in the plural boarding mode when adopting the present invention.

REFERENCE SIGNS LIST 1 vehicle
2 wheel
3 automatic/manual driving mode selection switch
4 control device
5 brake
6 brake pedal
7 brake signal
31 mode selection signal
41 brake control device
42 automatic driving control device
61 brake signal
71 automatic driving brake signal
81 automatic driving control signal

The invention claimed is:

1. A vehicle control device comprising
a pitch angle adjustment unit that adjusts a pitch angle, which is an inclination of a vehicle generated in the vehicle when braking the vehicle, or a change amount of the pitch angle,
wherein the pitch angle adjustment unit adjusts the pitch angle according to a traveling mode of the vehicle; and
wherein
the vehicle has, as the traveling mode, a manual driving mode in which the vehicle is operated using a steering wheel and an automatic driving mode in which the vehicle is operated without using the steering wheel, and
the pitch angle adjustment unit adjusts the pitch angle or the change amount of the pitch angle according to switching between the automatic driving mode and the manual driving mode as the traveling mode, and performs control such that the pitch angle or the change amount of the pitch angle is larger in the manual driving mode than in the automatic driving mode.

2. The vehicle control device according to claim 1, wherein
the vehicle has, as the traveling mode, a single boarding mode in which the vehicle is boarded only by a driver, and a plural boarding mode in which a passenger other than the driver is also aboard, and
the pitch angle adjustment unit performs control such that the pitch angle or the change amount of the pitch angle is larger in the single boarding mode than in the plural boarding mode.

3. The vehicle control device according to claim 1, wherein the pitch angle adjustment unit adjusts a braking force of a front wheel brake of the vehicle and a braking force of a rear wheel brake of the vehicle to adjust the pitch angle and/or the change amount of the pitch angle.

4. The vehicle control device according to claim 1, wherein a pitch angle when a braking force of the vehicle increases is increased by setting a start timing of increasing the front wheel brake of the vehicle is started to be earlier than a timing of increasing an operation of the rear wheel brake of the vehicle.

5. The vehicle control device according to claim 4, wherein the pitch angle when the braking force of the vehicle increases is increased by setting an operation start timing of the front wheel brake to be earlier than an operation start timing of the rear wheel brake.

6. The vehicle control device according to claim 4, wherein the pitch angle when the braking force of the vehicle increases is increased by providing a region where an operation is performed such that the braking force by the front wheel brake is larger than the braking force by the rear wheel brake.

7. The vehicle control device according to claim 1, wherein regarding a change amount of a pitch angle when a braking force of the vehicle decreases, the change amount of the pitch angle is increased by providing a region where an operation is performed such that a braking force by a front wheel brake is smaller than a braking force by a rear wheel brake.

8. The vehicle control device according to claim 7, wherein the change amount of the pitch angle when the braking force of the vehicle decreases is adjusted such that a timing when the braking force generated by the front wheel brake becomes zero is later than a timing when the braking force generated by the rear wheel brake becomes zero.

9. The vehicle control device according to claim 1, wherein
regarding the manual driving mode, a vehicle body sway braking mode and a vehicle body sway suppression braking mode are set, and
the pitch angle is controlled to be larger in the vehicle body sway braking mode than in the vehicle body sway suppression braking mode, and switching between the vehicle body sway braking mode and the vehicle body sway suppression braking mode is performed by adjusting the pitch angle.

10. The vehicle control device according to claim 9, wherein control is performed in the vehicle body sway braking mode when a required braking force generated by a rear wheel brake is larger than a braking force upper limit value.

11. The vehicle control device according to claim 10, wherein the braking force upper limit value is a value smaller than a braking force by which wheels are locked.

12. The vehicle control device according to claim 9, further comprising a changeover switch for switching between the vehicle body sway braking mode and the vehicle body sway suppression braking mode.

13. The vehicle control device according to claim 1, wherein the pitch angle of the vehicle or the change amount of the pitch angle is made larger in a case where there is a braking command with a pedal operation than in a case where there is a braking command without the pedal operation.

14. A vehicle control device for a vehicle traveling in both a manual driving mode in which traveling is performed by a driver operating a steering wheel and a brake of the vehicle and an automatic driving mode in which an automatic driving control device automatically drives the vehicle, the vehicle control device comprising:
a selection signal input means for inputting a selection signal for the manual driving mode and the automatic driving mode;
a brake control signal output means for outputting a brake control signal for a front wheel of the vehicle and a brake control signal for a rear wheel of the vehicle; and
a calculation unit that applies the brake control signal for the front wheel of the vehicle and the brake control signal for the rear wheel of the vehicle to change a braking timing between the rear wheel and the front wheel or to change a braking force distribution between the rear wheel and the front wheel, in order to change a pitch angle between the manual driving mode and the automatic driving mode.

15. The vehicle control device according to claim 14, wherein
in the manual driving mode, the brake control signal for the front wheel of the vehicle is applied prior to the brake control signal for the rear wheel of the vehicle, and
in the automatic driving mode, the brake control signal for the rear wheel of the vehicle is applied prior to the brake control signal for the front wheel of the vehicle.

16. The vehicle control device according to claim 14, wherein the pitch angle of the vehicle, and/or a change amount of the pitch angle is input, and the brake control signal for the front wheel of the vehicle and the brake control signal for the rear wheel of the vehicle are defined depending on a target pitch angle of the vehicle and/or a difference from a change amount of the pitch angle during brake control in the automatic driving mode.

17. The vehicle control device according to claim 14, wherein
the brake control signals in the manual driving mode have a period in which the brake control signal for the rear wheel of the vehicle is smaller than the brake control signal for the rear wheel of the vehicle in the automatic driving mode, and
the brake control signals in the automatic driving mode have a period in which the brake control signal for the front wheel of the vehicle is larger than the brake control signal for the front wheel of the vehicle in the manual driving mode.

18. The vehicle control device according to claim 14, wherein the brake control signal from the calculation unit causes transition from a period in which braking forces acting on the front wheel of the vehicle and the rear wheel of the vehicle change to a period in which the braking forces are constant, and a ratio in the automatic driving mode is higher than a ratio in the manual driving mode regarding the ratio of the braking force acting on the rear wheel of the vehicle to the braking force acting on the front wheel of the vehicle after the transition.

19. A vehicle equipped with the vehicle control device according to claim 1.

* * * * *